(12) United States Patent
Amundson

(10) Patent No.: US 10,550,584 B2
(45) Date of Patent: Feb. 4, 2020

(54) FLEXIBLE CORNER TRIM PRODUCT

(71) Applicant: Gregory A. Amundson, Scandia, MN (US)

(72) Inventor: Gregory A. Amundson, Scandia, MN (US)

( * ) Notice: Subject to any disclaimer, the term of this patent is extended or adjusted under 35 U.S.C. 154(b) by 114 days.

(21) Appl. No.: 15/727,957

(22) Filed: Oct. 9, 2017

(65) Prior Publication Data

US 2018/0030740 A1 Feb. 1, 2018

Related U.S. Application Data

(63) Continuation of application No. 13/632,447, filed on Oct. 1, 2012, now Pat. No. 9,783,999, which is a
(Continued)

(51) Int. Cl.
*A47K 3/00* (2006.01)
*E04F 19/04* (2006.01)
(Continued)

(52) U.S. Cl.
CPC ............ *E04F 19/064* (2013.01); *B29C 48/12* (2019.02); *B29C 48/21* (2019.02); *B29C 48/22* (2019.02); *A47K 3/008* (2013.01); *B29C 48/03* (2019.02); *B29C 48/16* (2019.02); *B29C 48/20* (2019.02); *B29D 99/0003* (2013.01); *B29D 99/0053* (2013.01); *B29L 2009/00* (2013.01); *B29L 2031/003* (2013.01); *B29L 2031/26* (2013.01); *B32B 1/04* (2013.01); *B32B 7/04* (2013.01);
(Continued)

(58) Field of Classification Search
None
See application file for complete search history.

(56) References Cited

U.S. PATENT DOCUMENTS 2,303,864 A * 12/1942 Reasor ................... A47K 3/008
52/716.2
2,541,768 A * 2/1951 Keller .................... A47K 3/008
52/287.1
(Continued)

FOREIGN PATENT DOCUMENTS

CN 201787064 U 4/2011
DE 2530235 2/1977
(Continued)

OTHER PUBLICATIONS

Machine Translation of DE 20121632 U1, Feb. 2003 (Year: 2003).*
(Continued)

*Primary Examiner* — Jeffrey A Vonch
(74) *Attorney, Agent, or Firm* — Patterson Thuente Pedersen, P.A.

(57) ABSTRACT

A trim piece for sealing a work surface including a body having a first side, a second side, and a span disposed between the first side and the second side, wherein the first side and the second side are joined at a junction defining an angle between the first side and the second side of between 80 degrees and 100 degrees, a topcap is affixed to the span of the body, wherein the topcap includes a left side having a first wing and a right side having a second wing, an adhesive is bonded to the first side of the body and an aperture is disposed within the body.

16 Claims, 16 Drawing Sheets

Related U.S. Application Data continuation-in-part of application No. 12/843,582, filed on Jul. 26, 2010, now abandoned.

(60) Provisional application No. 61/228,757, filed on Jul. 27, 2009.

(51) Int. Cl.

| | | |
|---|---|---|
| B32B 1/04 | (2006.01) | |
| B32B 7/04 | (2019.01) | |
| B32B 27/06 | (2006.01) | |
| B29C 48/12 | (2019.01) | |
| B29C 48/20 | (2019.01) | |
| B29C 48/21 | (2019.01) | |
| B29C 48/22 | (2019.01) | |
| E04F 19/06 | (2006.01) | |
| E04B 1/68 | (2006.01) | |
| B29L 31/00 | (2006.01) | |
| B29L 31/26 | (2006.01) | |
| B29C 48/16 | (2019.01) | |
| B29L 9/00 | (2006.01) | |
| B29C 48/03 | (2019.01) | |
| B29D 99/00 | (2010.01) | |
| B32B 27/04 | (2006.01) | |

(52) U.S. Cl.
CPC ............. *B32B 27/04* (2013.01); *B32B 27/06* (2013.01); *E04B 1/6803* (2013.01); *E04F 19/04* (2013.01); *E04F 19/045* (2013.01); *E04F 19/0477* (2013.01); *E04F 2019/0404* (2013.01); *E04F 2019/0422* (2013.01); *E04F 2019/0431* (2013.01); *E04F 2019/0454* (2013.01); *Y10T 428/139* (2015.01); *Y10T 428/24479* (2015.01); *Y10T 428/24488* (2015.01); *Y10T 428/24777* (2015.01); *Y10T 428/28* (2015.01); *Y10T 428/2852* (2015.01)

(56) References Cited

U.S. PATENT DOCUMENTS

| | | | |
|---|---|---|---|
| 2,831,049 A | 4/1958 | Cabral | |
| 3,029,303 A | 4/1962 | James | |
| 3,200,547 A | 8/1965 | Johnson | |
| 3,216,164 A | 11/1965 | Stillman | |
| 3,271,232 A * | 9/1966 | Moore | E06B 3/5814 428/130 |
| 3,458,386 A * | 7/1969 | Shanok | A47B 95/04 428/163 |
| 3,777,438 A * | 12/1973 | Brown | B60R 13/04 52/718.04 |
| 4,246,303 A | 1/1981 | Townsend | |
| 4,289,818 A * | 9/1981 | Casamayor | A47K 3/001 4/614 |
| 4,404,425 A | 9/1983 | Rich | |
| 4,530,865 A | 7/1985 | Sprenger | |
| 4,601,149 A * | 7/1986 | Dokan | A47K 3/001 428/100 |
| 4,629,648 A * | 12/1986 | Minick | B29C 48/30 428/189 |
| 4,654,250 A * | 3/1987 | Black | A47K 3/001 428/195.1 |
| 4,670,959 A | 6/1987 | Rosen | |
| 4,706,427 A * | 11/1987 | Zeilinger | A47K 3/001 52/287.1 |
| 4,719,733 A * | 1/1988 | Seles | A47K 3/008 52/287.1 |
| 4,760,681 A * | 8/1988 | Harrison | A47B 77/022 52/288.1 |
| 4,796,348 A | 1/1989 | Rosen | |
| 4,801,764 A | 1/1989 | Ohlhaber | |
| 4,829,730 A * | 5/1989 | Zeilinger | A47K 3/001 52/287.1 |
| 5,456,957 A * | 10/1995 | Jackson | B29C 45/1418 156/244.12 |
| 5,526,619 A | 6/1996 | Vagedes | |
| 5,730,446 A * | 3/1998 | Taylor | B60R 13/043 277/312 |
| 5,810,406 A * | 9/1998 | Reid, Jr. | B60R 13/04 293/128 |
| 6,259,843 B1 | 7/2001 | Kondo | |
| 6,332,479 B1 | 12/2001 | Ko | |
| 6,476,323 B2 | 11/2002 | Beebe et al. | |
| 6,491,468 B1 * | 12/2002 | Hagen | E04B 1/6803 277/316 |
| 6,511,742 B1 * | 1/2003 | Mussig | B32B 27/00 428/343 |
| 7,118,791 B2 | 10/2006 | Martel | |
| 8,292,517 B2 | 10/2012 | Allen et al. | |
| 9,783,999 B2 * | 10/2017 | Amundson | E04F 19/064 |
| 2001/0054266 A1 * | 12/2001 | Bennett | E04F 19/028 52/312 |
| 2003/0175482 A1 * | 9/2003 | Porter | A47K 3/008 428/172 |
| 2004/0087739 A1 | 5/2004 | Onder | |
| 2006/0005486 A1 * | 1/2006 | Robinson | A47K 3/008 52/211 |
| 2007/0138349 A1 | 6/2007 | Ayoub | |
| 2008/0047727 A1 | 2/2008 | Sexton et al. | |
| 2008/0125532 A1 | 5/2008 | Nelson | |
| 2008/0149362 A1 | 6/2008 | Ruddick | |
| 2009/0280288 A1 * | 11/2009 | Yaver | B65G 15/62 428/99 |
| 2009/0294016 A1 | 12/2009 | Sayres et al. | |
| 2011/0020580 A1 * | 1/2011 | Amundson | A47B 97/00 428/58 |
| 2011/0143113 A1 * | 6/2011 | Hatta | B60J 10/16 428/217 |
| 2013/0052424 A1 * | 2/2013 | Amundson | E04F 19/022 428/156 |
| 2013/0196113 A1 * | 8/2013 | Amundson | E04B 1/6803 428/136 |
| 2013/0266760 A1 * | 10/2013 | Amundson | E04B 1/6803 428/138 |
| 2014/0093689 A1 * | 4/2014 | Amundson | E04F 19/064 428/156 |

FOREIGN PATENT DOCUMENTS

| | | | | |
|---|---|---|---|---|
| DE | 9012015.9 U1 | 10/1990 | | |
| DE | 29801577 U1 * | 6/1998 | ............ | A47K 3/008 |
| DE | 19946617 A1 * | 5/2001 | ............ | B29C 63/02 |
| DE | 20121632 U1 * | 2/2003 | ........... | A47B 77/022 |
| DE | 20305171 U1 * | 10/2003 | ......... | E04F 19/0495 |
| DE | 20312315 U1 * | 11/2003 | ............ | E04F 19/045 |
| DE | 202007014686 U1 * | 1/2008 | ......... | A47G 27/0456 |
| DE | 102007015894 A1 | 10/2008 | | |
| DE | 202008011758 U1 * | 11/2008 | ............ | A47K 3/008 |
| EP | 0 134 455 A1 | 3/1985 | | |
| EP | 1359267 A2 * | 11/2003 | ............ | E04F 19/04 |
| EP | 1516971 A2 | 3/2005 | | |
| EP | 1700971 A2 | 9/2006 | | |
| EP | 1700971 A2 * | 9/2006 | ............ | E04F 19/045 |
| EP | 2082674 A1 | 7/2009 | | |
| EP | 2082674 A1 * | 7/2009 | ............ | A47K 3/0008 |
| EP | 2161384 A2 * | 3/2010 | ............ | A47K 3/008 |
| EP | 2191755 A1 * | 6/2010 | ............ | A47K 3/008 |
| FR | 2565023 A1 | 11/1985 | | |
| FR | 2568730 A1 | 7/1986 | | |
| GB | 530297 | 12/1940 | | |
| GB | 2022670 A | 12/1979 | | |
| GB | 2 120 464 A | 11/1983 | | |
| GB | 2182984 A | 5/1987 | | |
| GB | 2301153 A | 11/1996 | | |
| GB | 2301153 A * | 11/1996 | ............ | A47K 3/008 |
| GB | 2352867 | 2/2001 | | |

(56) References Cited

FOREIGN PATENT DOCUMENTS

| | | | | |
|---|---|---|---|---|
| GB | 2444089 | | 5/2008 | |
| GB | 2444089 A | * | 5/2008 | ............... H01B 7/40 |
| JP | 2006121881 | | 5/2006 | |

OTHER PUBLICATIONS

Machine Translation of EP 1700971 A2, Sep. 2006 (Year: 2006).*
Machine Translation of DE 102007015894 A1, dated Oct. 9, 2008.
Machine Translation of EP 134455 A1, Mar. 1985.
Machine Translation of FR 2568730 A1, dated Feb. 7, 1986.
Magic American ½ in.×16 Ft. Counter Trim (CT306T) from the HomeDepot, 3 pages, Jan. 11, 2012.
Reimer et al., Bio-Sense or Nonsense, Aug. 2008.
Application and File History for U.S. Appl. No. 12/843,582, filed Jul. 26, 2010. Inventor: Amundson.
Application and File History for U.S. Appl. No. 13/645,976, filed Oct. 5, 2012. Inventor: Amundson.
Application and File History for U.S. Appl. No. 13/827270, filed Mar. 14, 2013. Inventor: Amundson.
Application and File History for U.S. Appl. No. 13/872,823, filed Apr. 29, 2013. Inventor: Amundson.

* cited by examiner

FLEXIBLE CORNER TRIM PRODUCT

CROSS-REFERENCE TO RELATED APPLICATIONS

This application is a Continuation of U.S. application Ser. No. 13/632,447, filed Oct. 1, 2012, entitled "Flexible Corner Trim Product", which is a Continuation-In-Part of application Ser. No. 12/843,582, filed Jul. 26, 2010, entitled "Flexible Corner Trim Product", which claims the benefit of U.S. Provisional Application No. 61/228,757 filed Jul. 27, 2009, entitled "Flexible Caulking Product", each of which is incorporated herein in its entirety by reference.

TECHNICAL FIELD

The present invention generally relates to building products, and more particularly to flexible corner trim material for new construction, remodeling, kitchen and bathroom applications.

BACKGROUND

Flexible "caulking" products have been used exclusively for many years to seal corners of plumbing fixtures and finished wall and floor products. These corners commonly range from 25 to 90 degrees. In addition, certain caulk products are required in commercial applications for food prep and public eating establishments. Caulking products typically include numerous silicone based products, latex based products, polyurethane and many other materials. Unfortunately, with caulk being very flexible and almost fluid like in texture the finished application depends entirely on the skill of the applicator, surface condition and accessibility. A proper seal is often times not achieved and the end result can look very poor in appearance, dirty and poorly adhered to the substrate. In addition, improperly applied caulking products on horizontal surfaces can leave recessed areas that collect dirt and bacteria creating health hazards and aesthetically unappealing finishes.

The use of a fluid caulk product is also problematic because caulk products tend to expire over time as they cure in the container. Moreover, traditional caulk containers require the availability of a caulk gun to apply the caulking material to a surface in a desirable manner. In some instances, it is not possible to complete a caulking project when the caulk gun is missing among a construction site.

Research into other available products to solve the mess and inaccuracies of caulk have not revealed suitable options. There have been numerous applicators that try to aid in the application of caulk to achieve more desirable results but they still rely on the "base" product being a caulk material.

SUMMARY

The present invention provides a simple finished corner trim product without requiring the skill level for application that caulk does or the accessibility of a caulk gun. The present invention also provides a product that will not expire over time and/or become unusable do to curing in partial tubes.

The present invention includes a corner trim material composed of a single or multiple density extruded PVC, TPO, bio based polymer, EcoFlex, Elvax (or similar) product. The extrusion is defined by a cross section of between ⅛" and 4". In a preferred embodiment, the extrusion includes a 25-160 degree wedge.

In an alternative embodiment, the extrusion includes a single "leg" with a variable wedge shape at the bottom with a flat finished "cap" that has a variable proportioned "wing" on each side. The "wings" are an integral part of the trim as it is more flexible than the top cap and will contour itself to the irregularities of the surface being adhered to. The wedge and leg has 3M VHB Tape (or similar adhesive product), manufactured by 3M Company of St. Paul, Minn., and applied to one or both sides of the wedge or leg to adhere the product to any surface and also to provide a tight bond and seal.

In another embodiment, the invention includes a trim piece for sealing a work surface. The trim piece has a body that includes a first side, a second side, and a span disposed between the first side and the second side. The first side and the second side are joined at a junction. A topcap is affixed to the span of the body. The topcap includes a left side and a right side and adhesive is bonded to the first side of the body.

In yet another embodiment, the invention includes a trim piece for sealing a work surface including a body having a first side, a second side, and a span disposed between the first side and the second side. The first side and the second side are joined at a junction defining an angle between the first side and the second side of between 80 degrees and 100 degrees. A topcap is affixed to the span of the body. The topcap includes a left side having a first wing and a right side having a second wing. An adhesive is bonded to the first side of the body and an aperture is disposed within the body.

In still another embodiment, the invention includes method for sealing a void in a work surface. The method includes the step of obtaining trim piece having a body including a first side, a second side, and a span disposed between the first side and the second side. The first side and the second side are joined at a junction defining an angle between the first side and the second side of between 80 degrees and 100 degrees. The topcap is affixed to the span of the body, wherein the topcap includes a left side having a first wing and a right side having a second wing. Adhesive is bonded to the first side of the body, wherein the adhesive includes a removable cover. An aperture is disposed within the body. The method further includes the step of removing the removable cover from the adhesive and placing the adhesive in contact with the work surface such that the junction of the trim piece is disposed within the void.

DETAILED DESCRIPTION OF THE DRAWINGS

Figure 1:
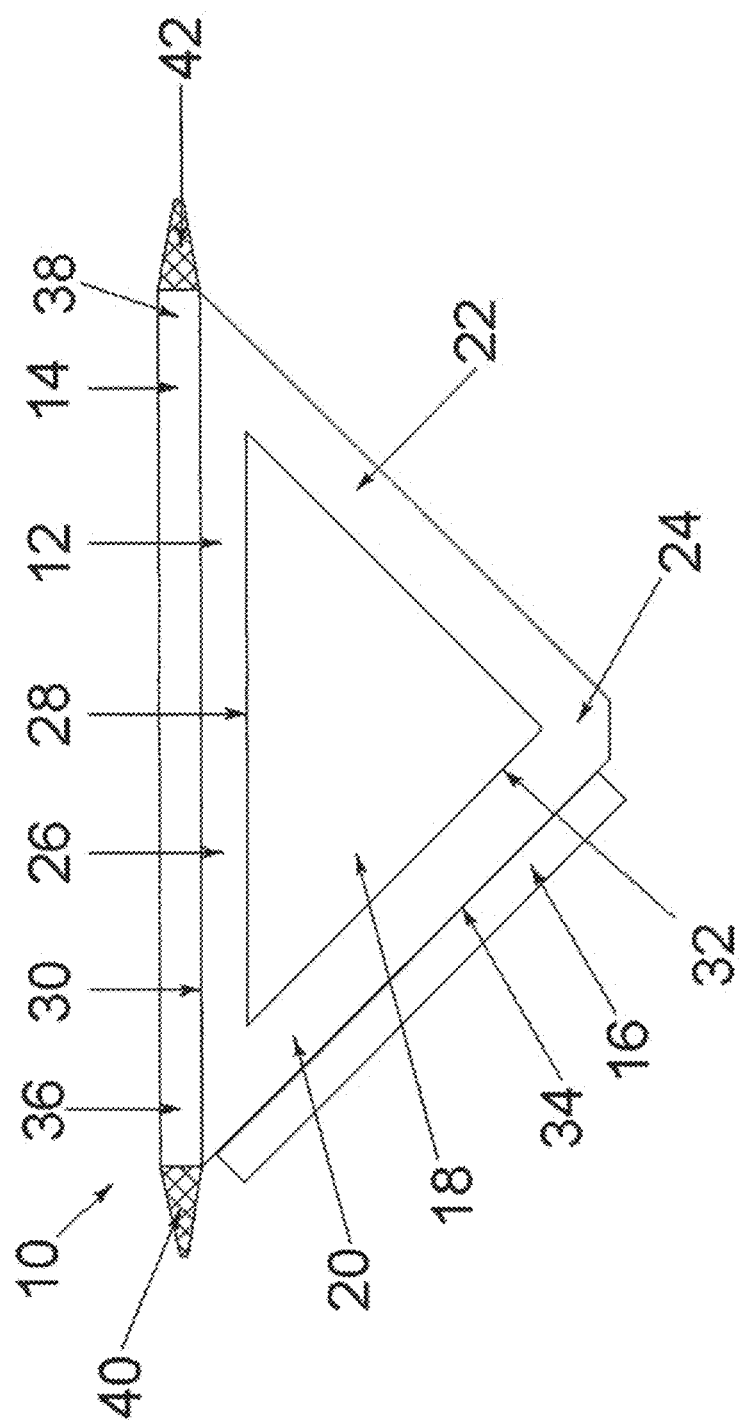
FIG. 1 is a cross-sectional view of the trim piece in accordance with the present invention.

With reference to FIG. 1, a cross-sectional view of trim piece 10 is shown. It should be understood that trim piece 10 is not-specific in length. Rather, it is preferably fabricated during an extrusion process and can be trimmed to a length that is suitable for a specific application. As a fundamental matter, it should be understood that the trim piece is flexible. As such, it can be manipulated to conform to a desired surface.

Trim piece 10 is defined by body 12, topcap 14 and adhesive 16. In a preferred embodiment, body 12 has a triangular cross-sectional shape that includes aperture 18. Aperture 18 serves as a cooling tunnel that is useful in forming trip piece 10.

Body 12 includes first side 20 and second side 22. In a preferred embodiment, first side 20 and second side 22 are substantially equal in length. First side 20 and second side 22 intersect at junction 24. In a preferred embodiment, junction 24 has a substantially flat configuration to provide clearance when trim piece 10 is applied to a surface. Opposite body 12 from junction 24 is span 26. Span 26 extends from first side 20 to second side 22. In a preferred embodiment, the angle between first side 20 and second side 22 at junction 24 is between 80 degrees and 100 degrees, preferably 90 degrees.

Span 26 includes an interior side 28 and an exterior side 30. Topcap 14 is disposed about the exterior side 30 of span 26, and provides an aesthetically pleasing surface that serves as the visible portion of trim piece 10.

First side 20 includes an interior side 32 and an exterior side 34. Adhesive 16 is bonded to exterior side 34 and serves to fasten trim piece 10 to a work surface. It should be appreciated that adhesive 16 may be bonded to exterior side 34 by a wide array of mechanical or chemical means while remaining within the scope of the invention.

Topcap 14 includes a left side 36 and a right side 38. Wings 40 and 42 are disposed on left side 36 and right side 38 respectively. Wings 40 and 42 include a tapered configuration that provides a smooth surface that contacts the work surface to provide a smooth, even appearance as trim piece 10 abuts a work surface.

Figure 2:
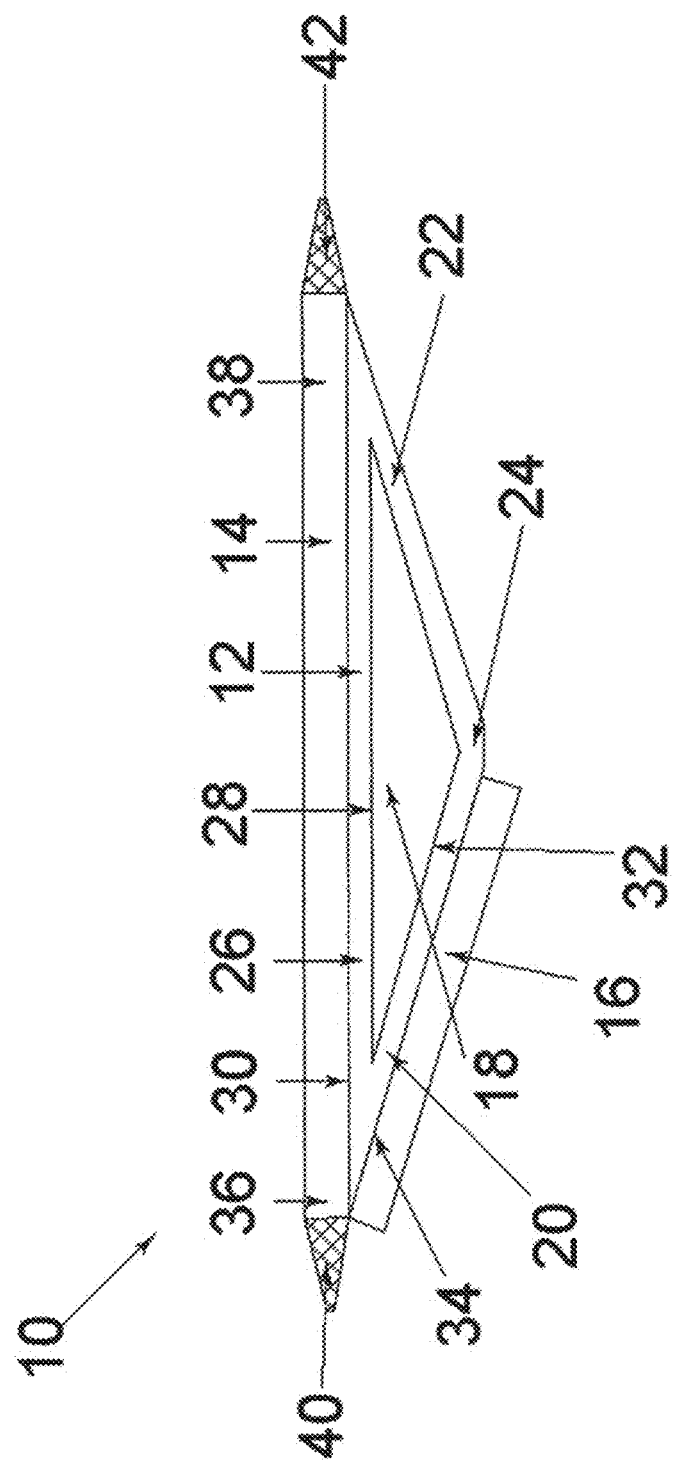
FIG. 2 is a cross-sectional view of an alternative embodiment of the trim piece in accordance with the present invention.

FIG. 2 shows a cross-sectional configuration of an alternative embodiment of trim piece 10. In this embodiment, the angle between first side 20 and second side 22 at junction 24 is between 150 degrees and 170 degrees, preferably 160 degrees.

Figure 3:
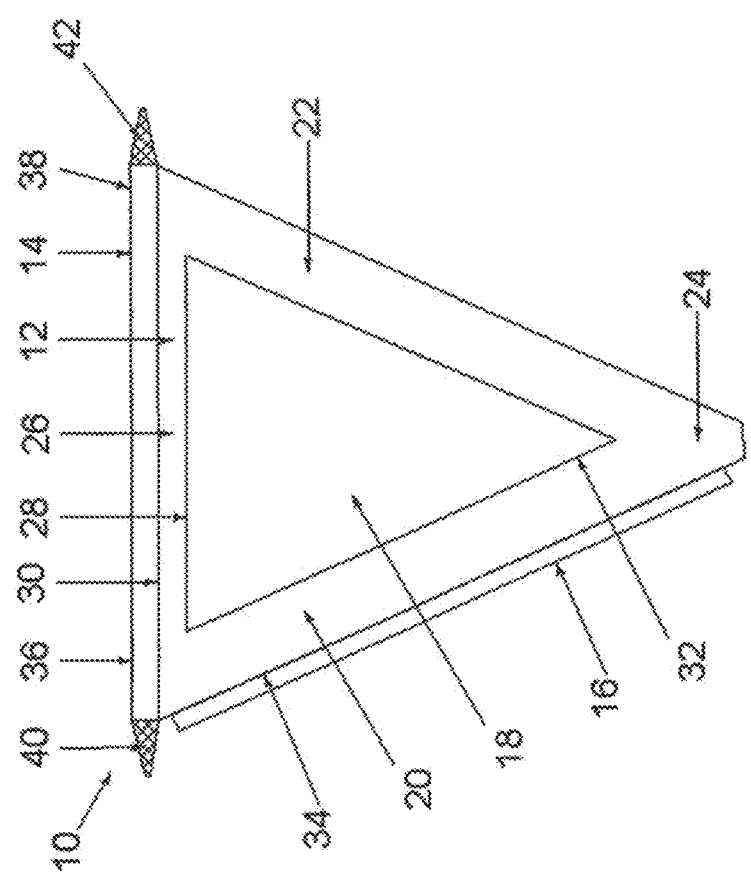
FIG. 3 is a cross-sectional view of an alternative embodiment of the trim piece in accordance with the present invention.

FIG. 3 shows a cross-sectional configuration of an alternative embodiment of trim piece 10. In this embodiment, the angle between first side 20 and second side 22 at junction 24 is between 15 degrees and 35 degrees, preferably 25 degrees.

The angled trim end or wings 40 and 42 will be proportionally variable in length and will terminate in a point that is approximately 10 degrees off of the line of the horizontal topcap 14. This angled point or wing 40 and 42 ensures the trim piece 10 will follow the irregularities of the surface being adhered to, thus creating as tight a seal as possible.

Each of the first side 20 and second side 22 of the trim piece 10 may include adhesive 16 depending on the application. In some embodiments, adhesive 16 may be disposed on both first side 20 and second side 22. In a preferred embodiment, adhesive 16 is only disposed on first side 20, as shown in FIG. 1. In a preferred embodiment, adhesive 16 is a 3M VHB (Very High Bond) tape manufactured by 3M Company of St. Paul, Minn. or similar product. The width and depth of the tape will depend on the extruded size of the respective first side 20 and second side 22. In a preferred embodiment, adhesive 16 will range from between 1/8" in width up to 3" in width. The thickness of the adhesive 16 will range from 0.025 mm up to 1/8".

Figure 5:
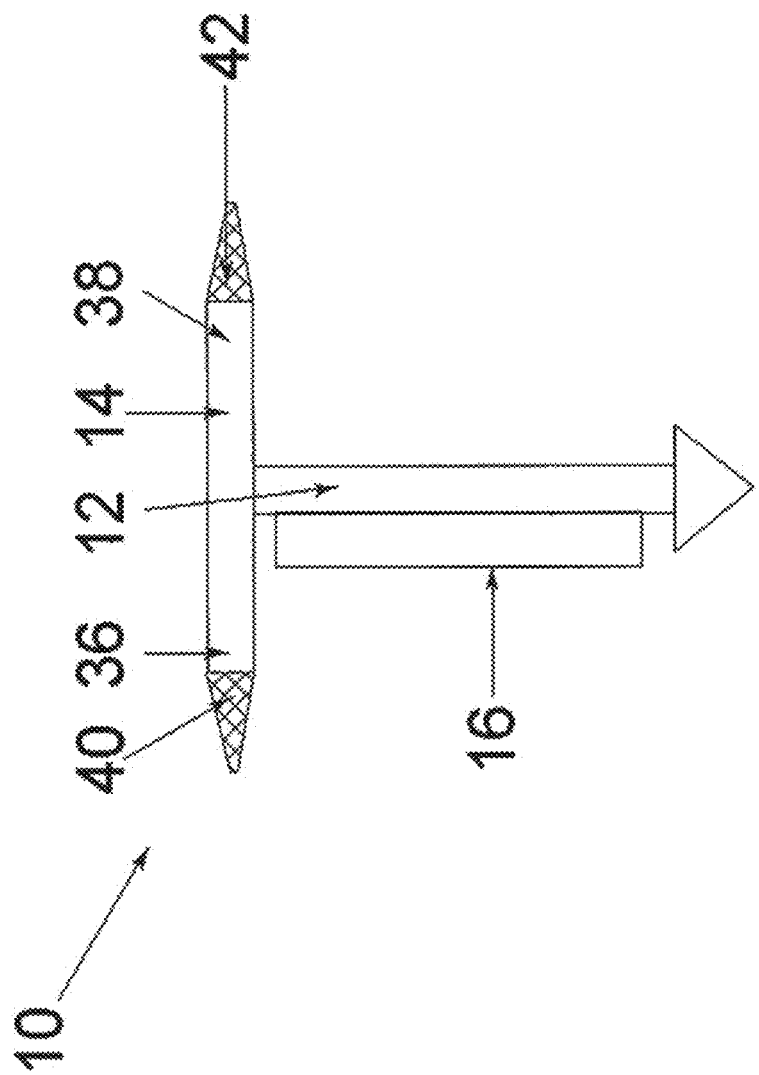
FIG. 5 is a cross-sectional side view of a leg in accordance with the present invention.

With reference to FIG. 5, the body 12 will have adhesive 16 on one of both sides tape depending on the application. The tape will be a 3M VHB (Very High Bond) tape manufactured by 3M Company of St. Paul, Minn. or similar product. The width and depth of the tape will depend on the extruded size of the Invention and will range from 1/8" in width up to 3" in width. The thickness of the tape will range from 0.025 mm up to 1/8". The adhesive 16 may be mechanically or chemically bonded to the first side 20, second side 22, or the body 12 of the trim piece 10 following the extrusion process. In a preferred embodiment, adhesive 16 includes a removable protective cover for the end user to remove during the installation process. The protective cover can comprise a peel-off strip. In another preferred embodiment, the protective cover of adhesive 16 includes an extended section of cover that will extend beyond the extruded end of the trim piece 10 to facilitate on site removal of the cover prior to application. This cover extension is between 1/8" and 1.5" in length and will have the adhesive 16 removed.

With reference to FIGS. 1-3, the body 12 of trim piece 10 will now be discussed. Junction 24 of the trim piece 10 preferably has a small flat "void" area which will allow for imperfections in the corner material that the trim piece 10 is applied to. This flat void will be variable in width depending on the extruded size of the invention. In a preferred embodiment, the actual size will range from 1/32" on up to 1/2".

The body 12 of trim piece 10 shall be an extrusion of PVC, TPO, Bio based polymer, EcoFlex, Elvax (or similar) product of the same density than the topcap 14. Both the topcap 14 and the body 12 may be a single or multiple durometer extrusion which will fuse both pieces together. The aperture 18 is hollow to aid in the cooling of the body 12 during the extrusion process. The aperture 18 will also aid the trim piece 10 in being applied to tight radius inner and outer corners and still maintain the ability of the wings 40 and 42 to make proper contact with the subsurface.

The configuration of topcap 14 will now be discussed. The top cap is comprised of PVC, TPO, Bio based polymer, EcoFlex, Elvax (or similar) material in variable widths depending on the final extrusion dimension and will range, in a preferred embodiment, from ¼" on up to 4". The depth of the topcap 14 will also depend on the final extrusion dimension and application. The length of the topcap 14 is dependent upon the overall length of the final trim piece 10. This piece will be a part of the single or multiple durometer extrusion and may be extruded with a denser PVC, TPO, Bio based polymer, EcoFlex, Elvax (or similar) material. The topcap 14 can be extruded in any color and also can be finished with a film of any color or pattern which would be applied during the extrusion process along with custom printed logos and designs for a particular vendor. In addition, the topcap 14 may also be produced with a porous finished film that can be later stained to match the adjacent material it is being applied to.

Figure 4:
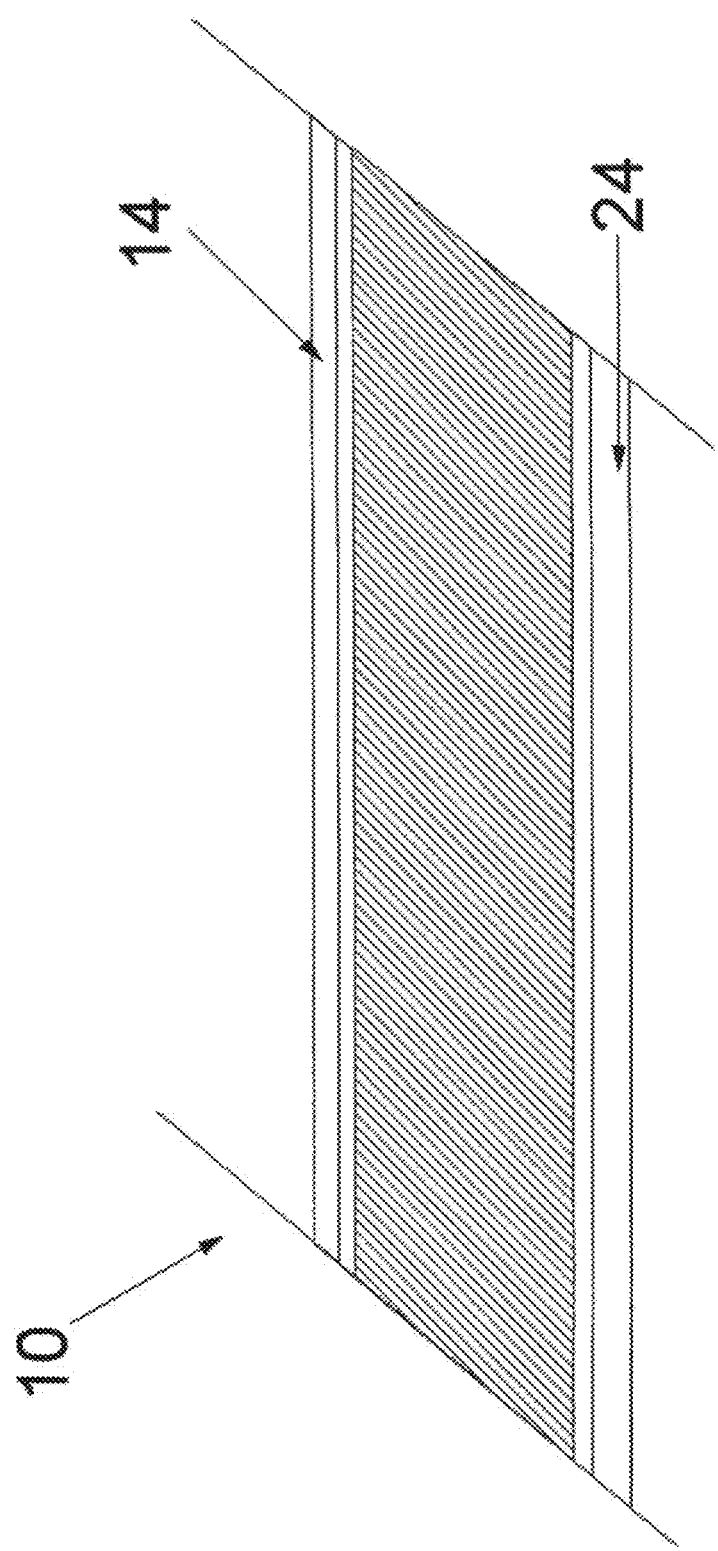
FIG. 4 is a cross-sectional side view of an alternative embodiment of the trim piece in accordance with the present invention.

With reference to FIG. 4, additional details of trim piece 10 will now be discussed. FIG. 4 shows a side elevation view showing the angled edge of the topcap. This view shows the 3M VHB (Very High Bond) tape manufactured by 3M Company of St. Paul, Minn. or similar product running the entire length of the trim piece 10. The length and width will vary depending on the final size of the extrusion and the overall length of the extrusion. The bottom tip of the junction 24 is also shown.

Figure 6:
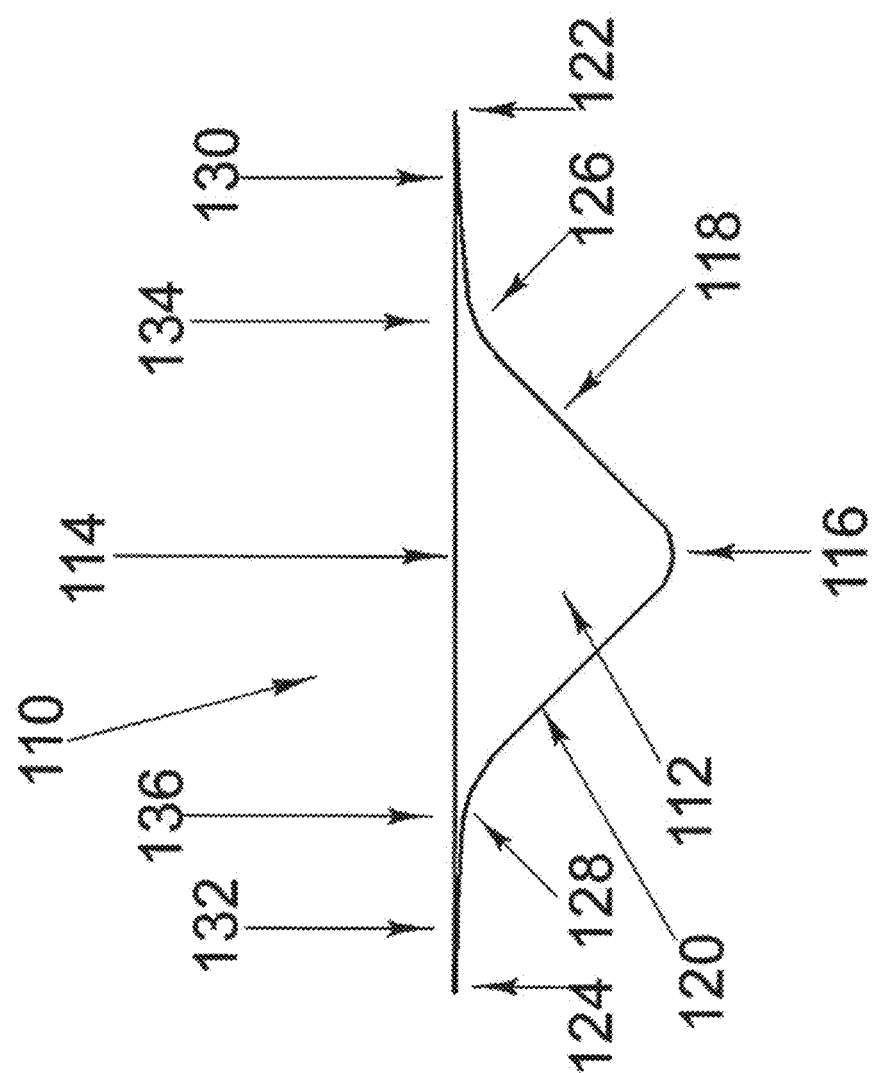
FIG. 6 is a cross sectional view of another embodiment of a trim piece according to the invention.

Referring to FIGS. 6-12 and in particular to FIG. 6, trim piece 110 according to another embodiment of the invention, generally includes body 112 and top cap 114. Body 112 generally presents rounded intersection 116 at the juncture of first side 118 and second side 120. Body 112 and top cap 114 extend outwardly to present first wing tip 122 and second wing tip 124. First wing tip 122 meets body 112 and presents radius 126 at the intersection of side 118 and wing tip 122. Second wing tip 124 meets body 112 and presents radius 128 at the intersection of side 120 and wing tip 124. First wing tip 122 presents flat decorative surface 130 where it joins top cap 114. Second wing tip 124 presents flat decorative surface 132 where it joins top cap 114. Top cap 114 presents decorative surface 134 and decorative surface 136 thereon.

Figure 9:
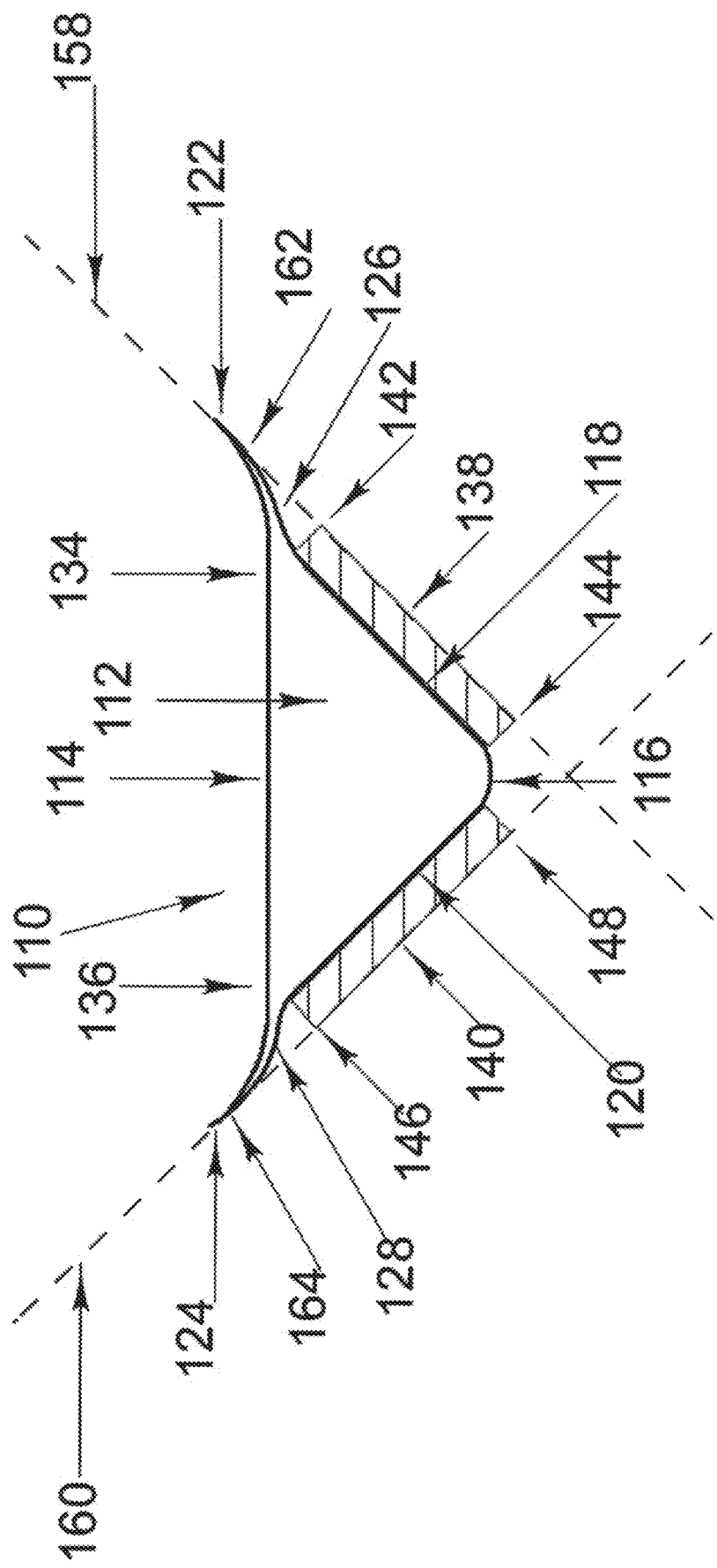
FIG. 9 is a cross sectional view of another embodiment of a trim piece according to the invention with flexed wing tips.
Figure 10:
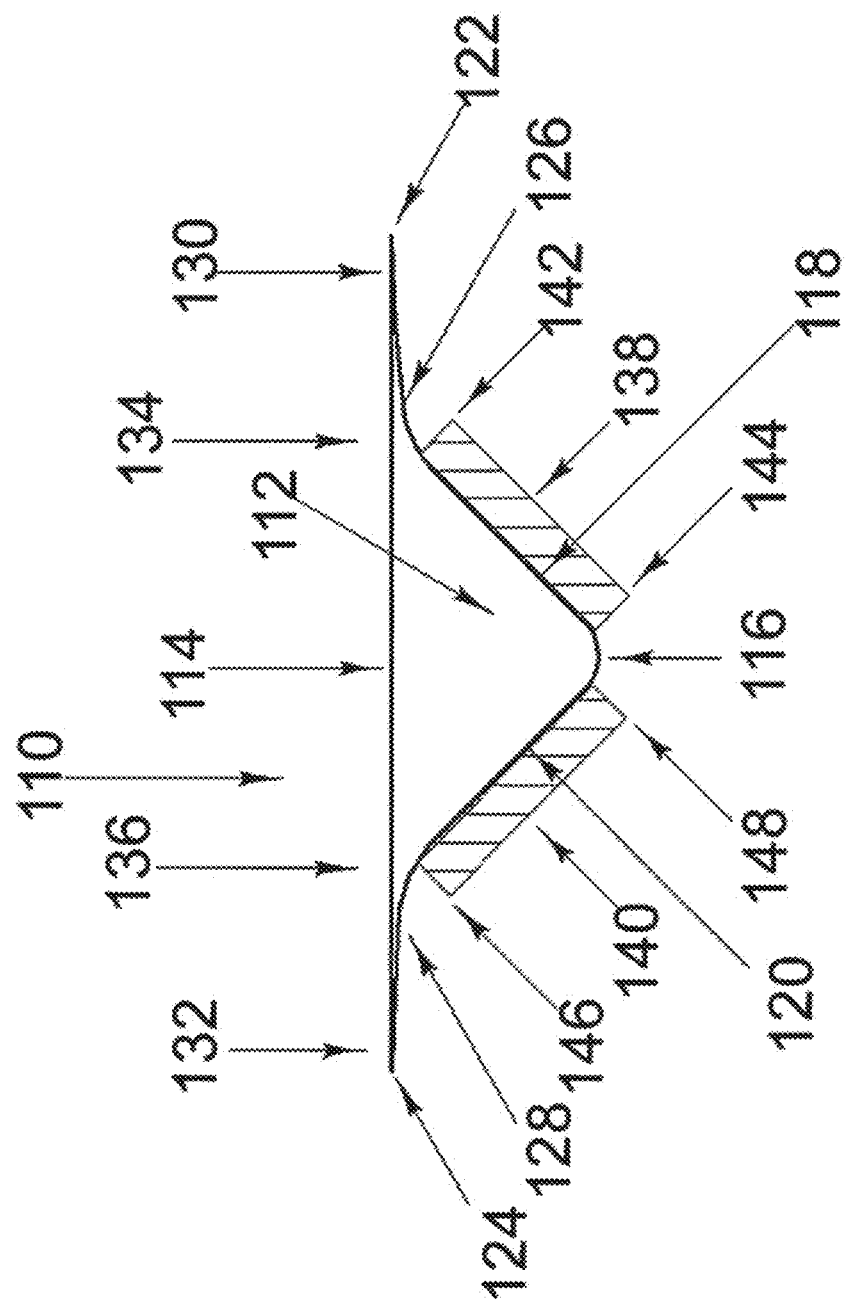
FIG. 10 is a cross sectional view of another embodiment of a trim piece according to the invention.

Referring particularly to FIG. 9, trim piece 110 includes, in addition to the structures previously described, adhesive 138 and adhesive 140.

Adhesive 138 further presents first adhesive limit 142 and second adhesive limit 144. Adhesive 140 present's third adhesive limit 146 and fourth adhesive limit 148.

Figure 11:
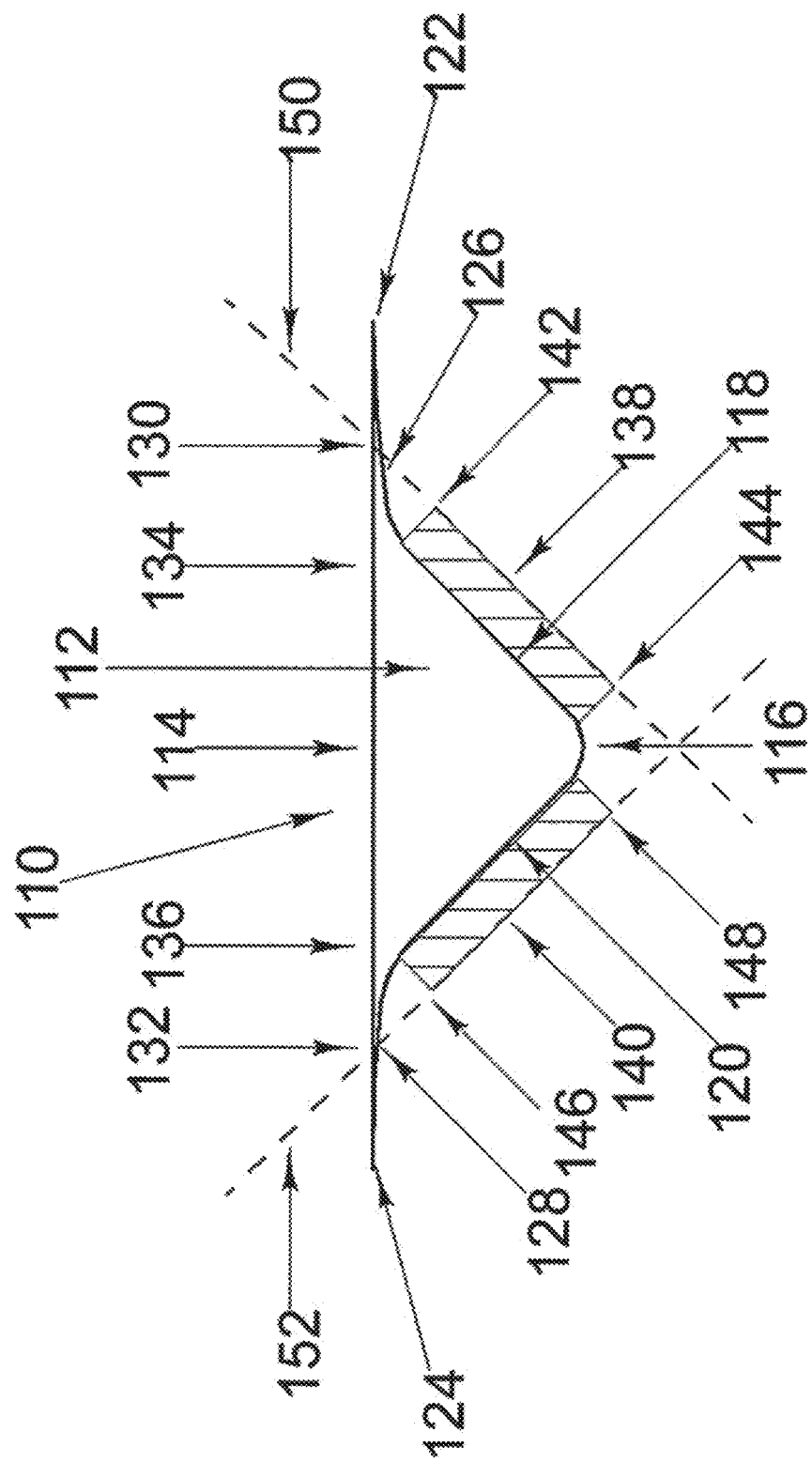
FIG. 11 is a cross sectional view of a trim piece according to another embodiment of the invention.

Referring to FIG. 11 and FIG. 9, adhesive 138 further presents imaginary line 150 showing limits of adhesive 138 depth. Adhesive 140 further present's imaginary line 152 showing limits of adhesive 140 depth.

Figure 12:
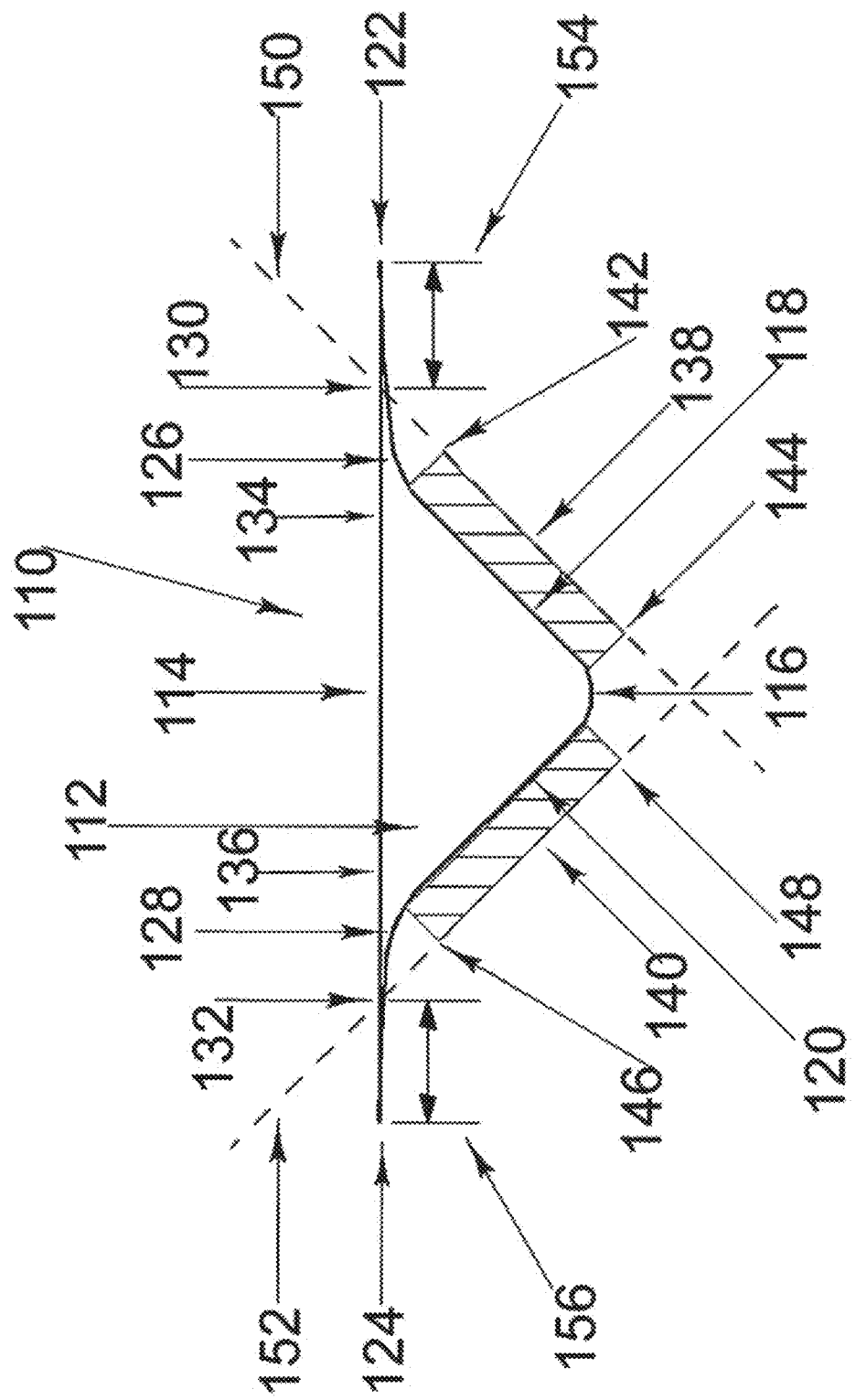
FIG. 12 is a cross sectional view of a trim piece according to another embodiment of the invention, depicting limits of adhesive depth to provide proper sealing of the wing at contact.

Referring now particularly to FIG. 12, first wing tip 122 presents first wing length 154. Second wing tip 124 presents second wing length 156.

Referring particularly to FIG. 9, imaginary lines 158 and 160 depicting limits of a depth of adhesive 138, 140 at an intersection with radius 126 and 128 to provide proper sealing of wings 122 and 124 at contact point 160 and 162 after flex of wings 122 and 124 upon application. Proper contact points 162 and 164 indicate where wings 122 and 124 contact a substrate to ensure a tight seal relative to depth of adhesive 138 and 140 and length of wings in relation to imaginary lines 154 and 156.

Figure 7:
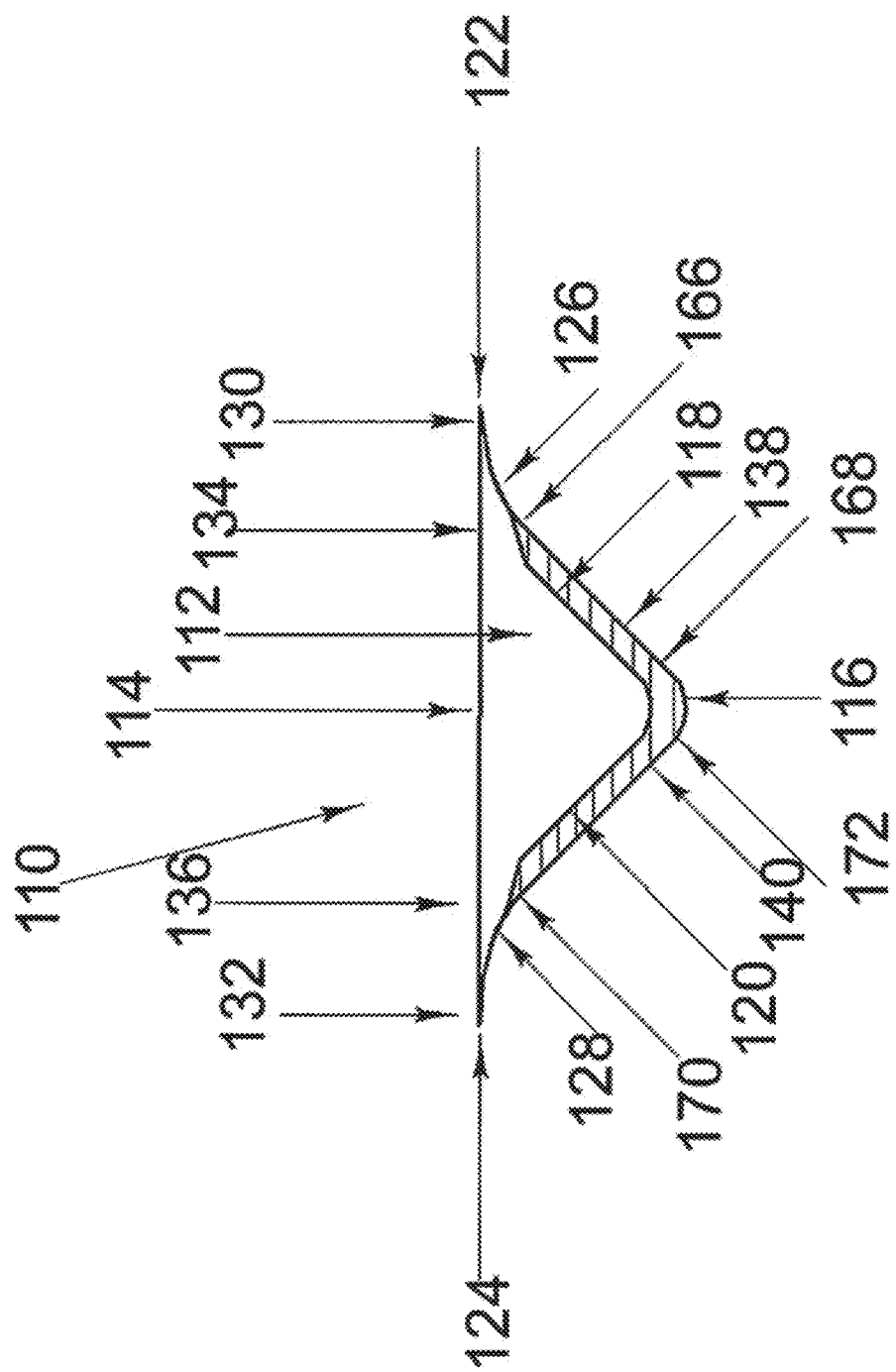
FIG. 7 is a cross sectional view of another embodiment of a trim piece according to the invention including a coextruded adhesive portion.

Referring particularly to FIG. 7, another embodiment of trim piece 110 is depicted. According to the depicted embodiment, beginning at adhesive limit 166, adhesive coextrusion 168 extends to adhesive limit 170 and includes adhesive coextrusion portion 172. Adhesive coextrusion 168, 172, approaches rounded intersection 116 and it extends from first side 118 to second side 120. Adhesive coextrusion 168, 172 has a generally V-shaped structure and is coextruded along with trim piece 110. The use of adhesive coextrusion 168, 172, simplifies the manufacturing process by eliminating the necessity to separately assemble adhesive 138, 140 to trim piece 110.

Figure 8:
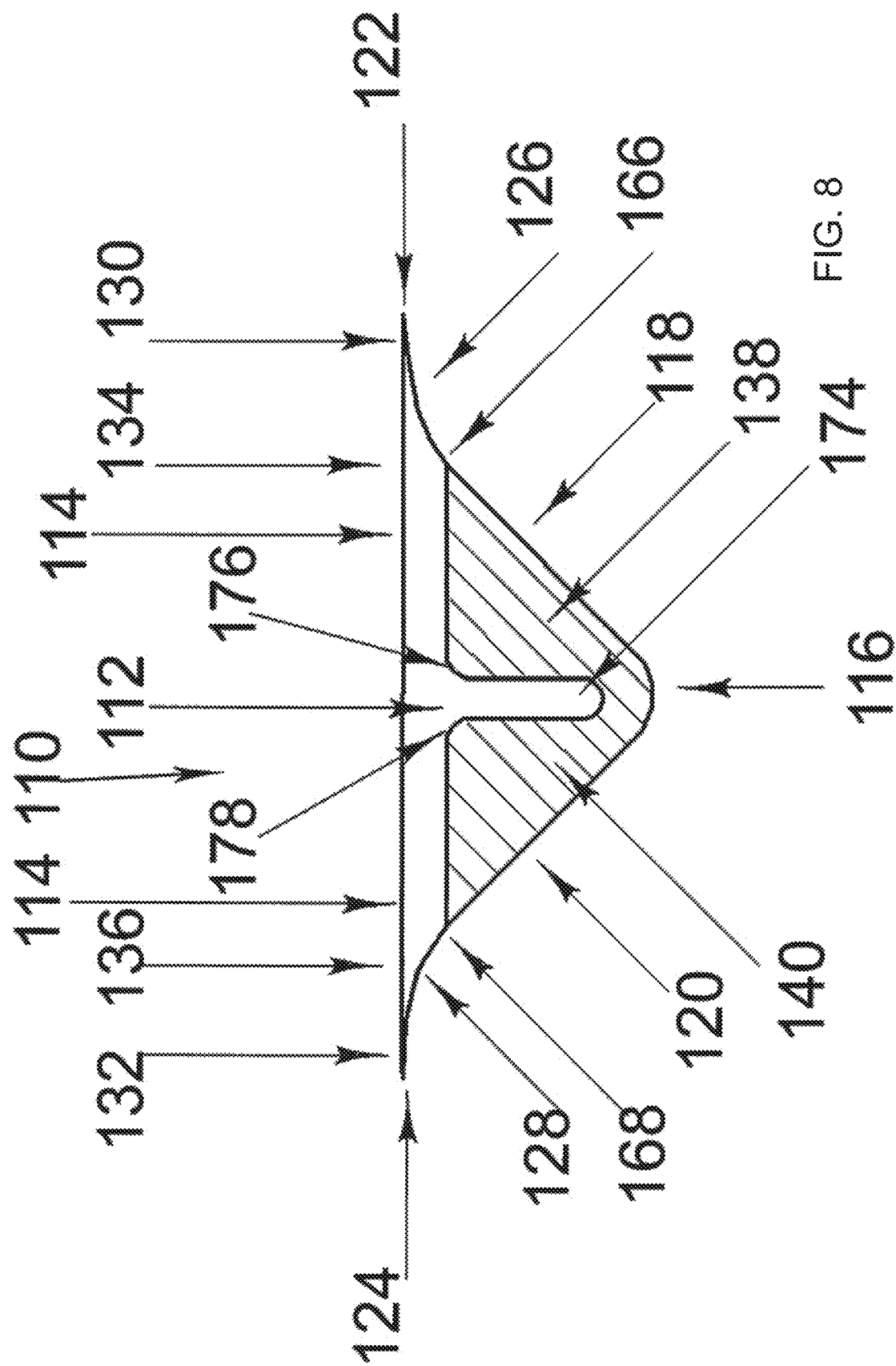
FIG. 8 is a cross sectional view of another embodiment of a trim piece according to the invention including a coextruded adhesive portion.

Referring particularly to FIG. 8, another example embodiment of the trim piece 110 is depicted. According to the depicted embodiment, trim piece 110 includes body 112 having top cap 114 and extrusion nipple 174 extending downwardly from top cap 114 to support adhesive 138 and 140. In the depicted embodiment, body 112 present's first nipple termination 178 and second nipple termination 178 where top cap 114 is integrally joined to extrusion nipple 174. In the embodiment of trim piece 110 depicted in FIG. 8, adhesive portions 138 and 140 coextruded along with body 112.

Figure 13:
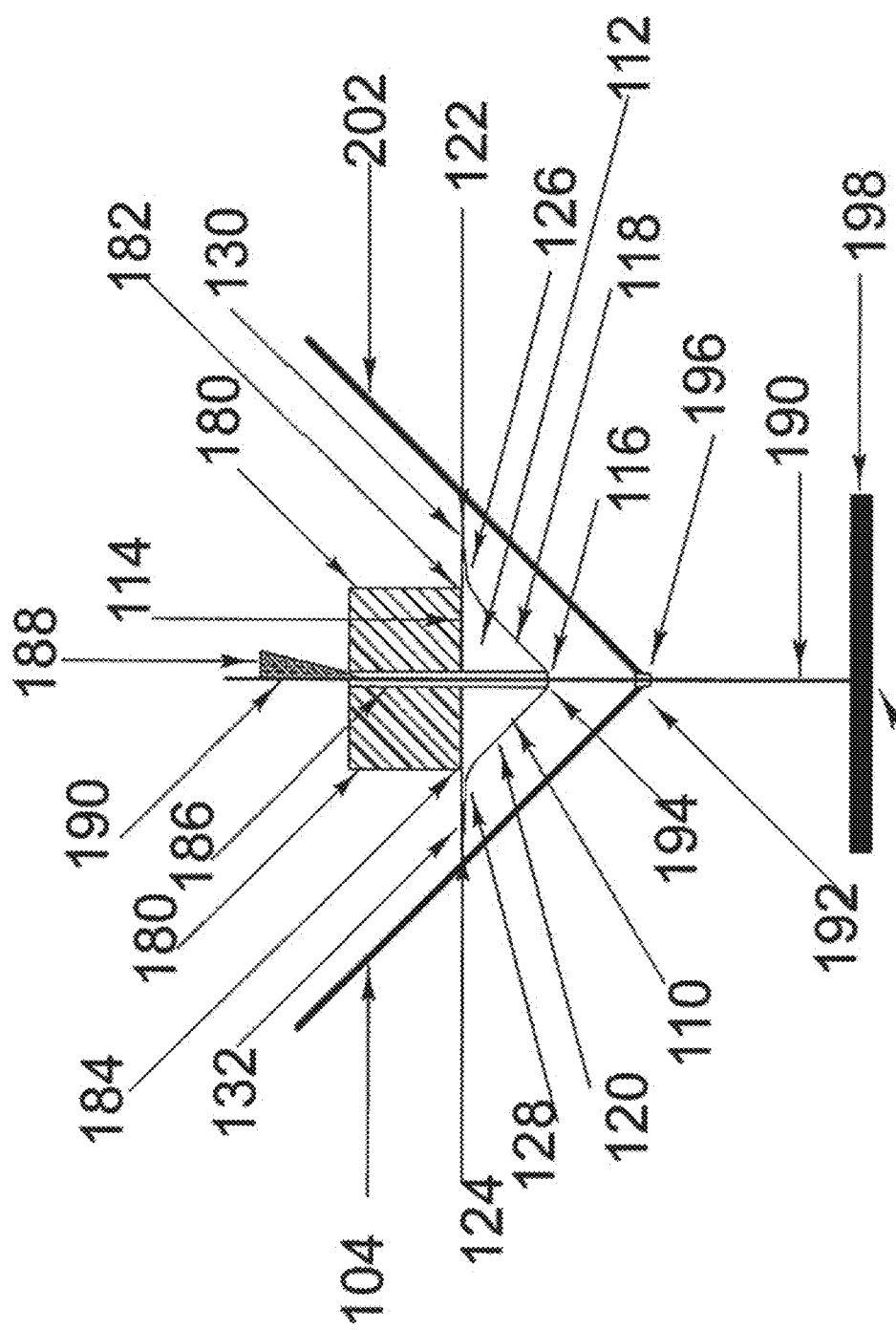
FIG. 13 is a cross sectional view of a testing apparatus according to another embodiment of the invention.
Figure 14:
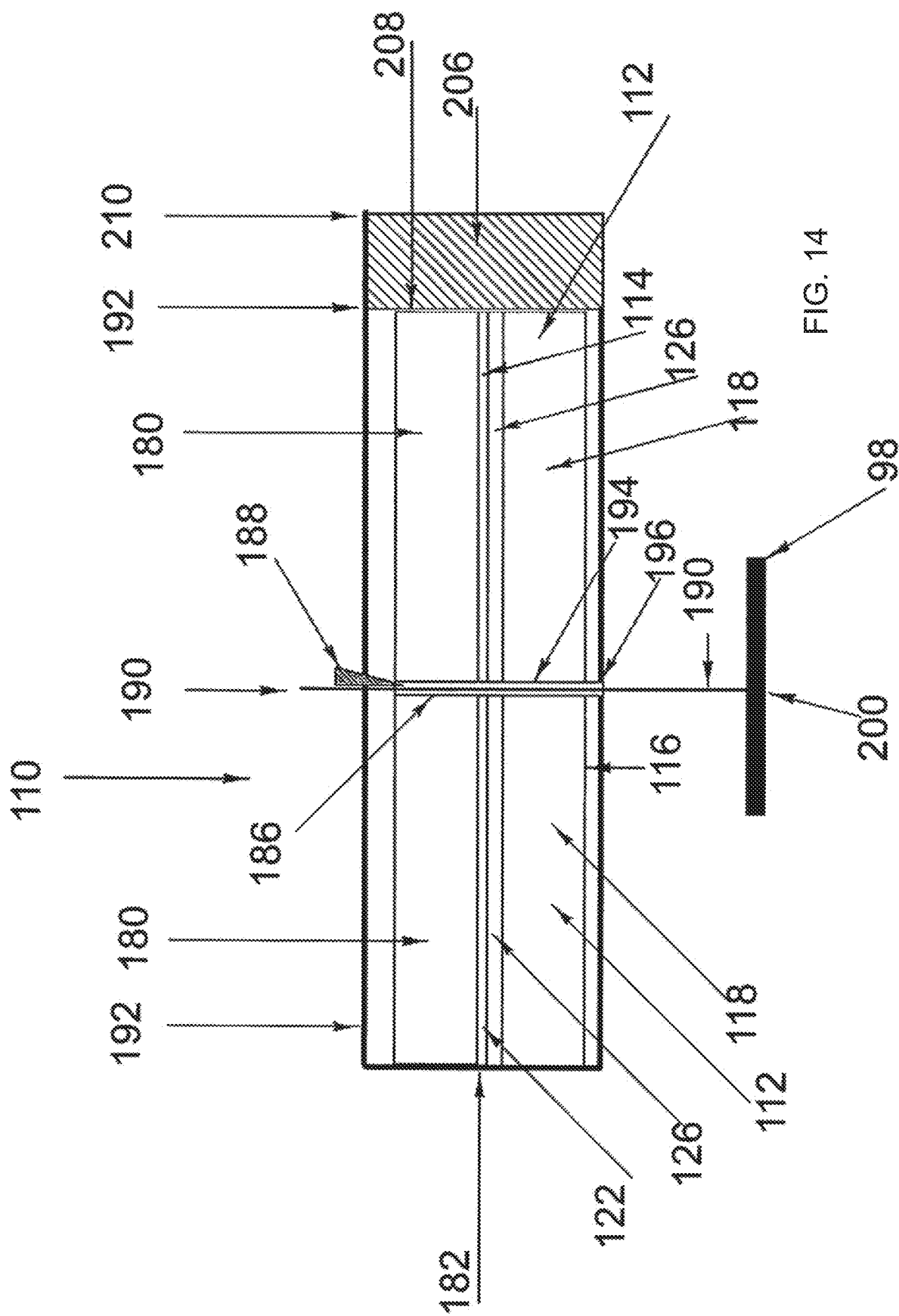
FIG. 14 is a longitudinal; sectional view of the testing apparatus of FIG. 13.

Referring particularly to FIGS. 13 and 14, test apparatus 179 is depicted. Test apparatus 179 generally includes block 180, having corner 182 and corner 184. Block 180 further presents passage 186 therethrough. Test apparatus 179 further includes wedge 188 and string 190. String 190 is passed through passage 186 and wedge 188 secures string 190 at the top passage 186. Test apparatus 179 further includes angle 192. Trim piece 110 is secured in angle 192 and, for testing, presents hole 194 passing through trim piece 110 through which string 190 passes. Angle 192 presents hole 196 passing through angle 192 through which string 190 also passes. Support plate 198 is secured to string 190 below angle 192. String 190 passes through support plate 198 at hole 200 and secured to support plate 198. Angle 192 further includes first angle side 202 and second angle side 204.

Referring particularly to FIG. 14, end block 206 is secured to angle 192. End block 206 is formed from rigid material and secured to angle 192 in such a way as to abut block 180 at juncture 208. End block 206 presents end 210 which, according to the depicted embodiment, is coplanar with end of angle 192.

In operation, trim piece 110 is secured at a juncture between two surfaces that meet at approximately 90°. Other angles can be accommodated by changes in the angular structure of trim piece 110. First wing tip 122 and second wing tip 124 are deformed by pressure applied to trim piece 110. Adhesive 138 and adhesive 140 adhesively adhere to the angle structures to which trim piece 110 is applied.

An important issue identified by the inventors of the present invention is the interaction between adhesive 138, adhesive 140 and the flexible resiliency of first wing tip 122 and second wing tip 124. Adhesive 138 and adhesive 140 must have sufficient adhesive qualities to overcome the flexible resiliency of first wing tip 122 and second wing tip 124. Thus, adhesive 138 and adhesive 140 secure trim piece 110 for a long term while also providing sufficient adhesive force against first wing tip 122 and second wing tip 124 to resist the resiliency of first wing tip 122 and second wing tip 124 to seal trim piece 110 to the corner to which it is applied.

Referring particularly to FIGS. 13 and 14, the inventors of the present invention have also invented a test apparatus to determine appropriate qualities for adhesive 138 and adhesive 140 as related to the flexible resiliency of first wing tip 122 and second wing tip 124. The material of which body 112 is made, is related to determining the relationship between the adhesive and first wing tip 122 and second wing tip 124.

To perform testing according to an embodiment of the presently described invention, a section of trim piece 110 is cut to a standard length and placed in angle 192 to test the flexibility of first wing tip 122 and second wing tip 124. Angle 192 is a rigid structure pierced by hole 196. Block 180 is placed on top of a section of trim piece 110 to be tested. String 190 is passed through hole 192 and then through hole 194 in trim piece 110. String 190 is secured in place by the application of wedge 188. Weights are then applied to support plate 198 which draws string 190 downward, thus applying force to trim piece 110. The flexible resiliency qualities of first wing tip 122 and second wing tip 124 can thus be determined by observing the flexure of first wing tip 122 and second wing tip 124 along with the amount of weight applied to support plate 198. Accordingly, the flexible resiliency of first wing tip 122 and second wing tip 124 can be determined, thus allowing determination of the required qualities for adhesive 138 and adhesive 140.

The design of first wing tip 122 and second wing tip 124 of trim piece 110 as disclosed herein, is important to the effectiveness of adhesive 138 and adhesive 140 and long term performance of trim piece 110. The relationship between the wings and the adhesives is engineered so to create an equilibrium between flexibility of first wing tip 122, second wing tip 124 and the ability of adhesive 138, 140 to resist peel and tensile forces which may otherwise cause premature failure.

The inventors have observed that the stiffness of first wing tip 122 and second wing tip 124 is determined in part by the durometer measured by Shore a of the polymer resin. Polymer resins may include polyvinyl chloride, polyurethane, silicone, bio-polymers, other petroleum resins and bioresins or a blend of both petroleum and bioresins. In addition to durometer, temperature can also have an effect on the flexibility of the polymer. This is particularly true of polyvinyl chloride material.

In designing a uniformed testing mechanism to determine this relationship a specific weight is placed on plate 198, attached to string 190, that passes through hole 196 of angle 192 and continues through hole 196 of block 180. The string 190 is anchored by wedge 188. Trim piece 110 rests against first angle side 202 and second angle side 204. Weight is applied to plate 198 until first wing tip 122 and second wing tip 124 flexed down against angle sides 202 and 204.

Adhesive 138, 140 must withstand the peel and tensile forces resulting from the resiliency of first wing tip 122 and second wing tip 124 which is related to the durometer measured by Shore A properties of trim piece 110. Accordingly, if equilibrium is properly attained adhesive 138, 140 maintains an effective bond between trim piece 110 and an angle structure to which trim piece 110 is applied.

According to test parameters utilized herein, a two inch long piece of trim piece 110 is tested at 70° Fahrenheit. Various trim pieces 110 tested have a durometer measured by Shore A ranging from 55 to 90. Adhesive 138, 140 tested have a 180° peel adhesion, when applied to stainless steel, of between 40 ounces per inch and 85 ounces per inch.

Test results determine that the amount of weight required to flex first wing tip 122 and second wing tip 124 to achieve contact with angle 192 range between a weight of 128 grams and 294 grams with the described test apparatus.

Wing length of first wing tip 122 and second wing tip 124 according to the invention is determined by the intersection of imaginary line 150 and imaginary line 152 through first wing tip 122 and second wing tip 124. If adhesive 138 and adhesive 140 has a thickness of X, then the length of first wing tip 122 and second wing tip 124 from the intersection lines 150 and 152 with first wing tip 122 and second wing tip 124 shall be at least equal to X.

According to one example embodiment of the invention, the length of first wing tip 122 and second wing tip 124 has a two to one ratio with the thickness of adhesive 138 and adhesive 140.

Figure 15:
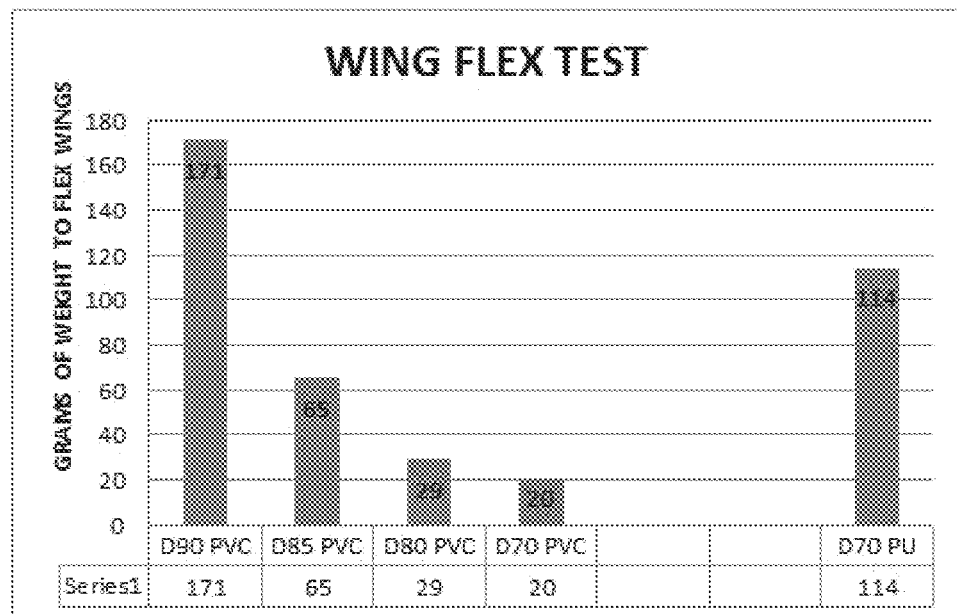
FIG. 15 is a graph and legend depicting results of a wing flex test according to an embodiment of the invention.

According to another example embodiment of the invention, a wing flex test was performed to determine the amount of weight required to flex first wing tip 122 and second wing tip 124 into angle 192. Results of this testing are depicted in FIG. 15.

A surface bonding test was also performed to determine the relationship between wing flexibility and peel adhesion of adhesive tapes after application of trim piece 110.

Test parameters included test samples 3.5 inches in length having a finished face of 0.543 inches. The trim piece was applied to rigid PVC angle 192 and monitored at various intervals to determine any failure of the bond between the adhesive tape to angle 192 or the adhesive tape to trim piece 110. Trim pieces 110 tested that were formed from PVC were primed with 3M primer 94, while a polyurethane trim piece 110 was primed with acetone. Adhesive tape used was a proprietary Siltak® tape which utilizes a silicone adhesive with a 180° peel adhesion of 35 ounces per inch.

Figure 16:
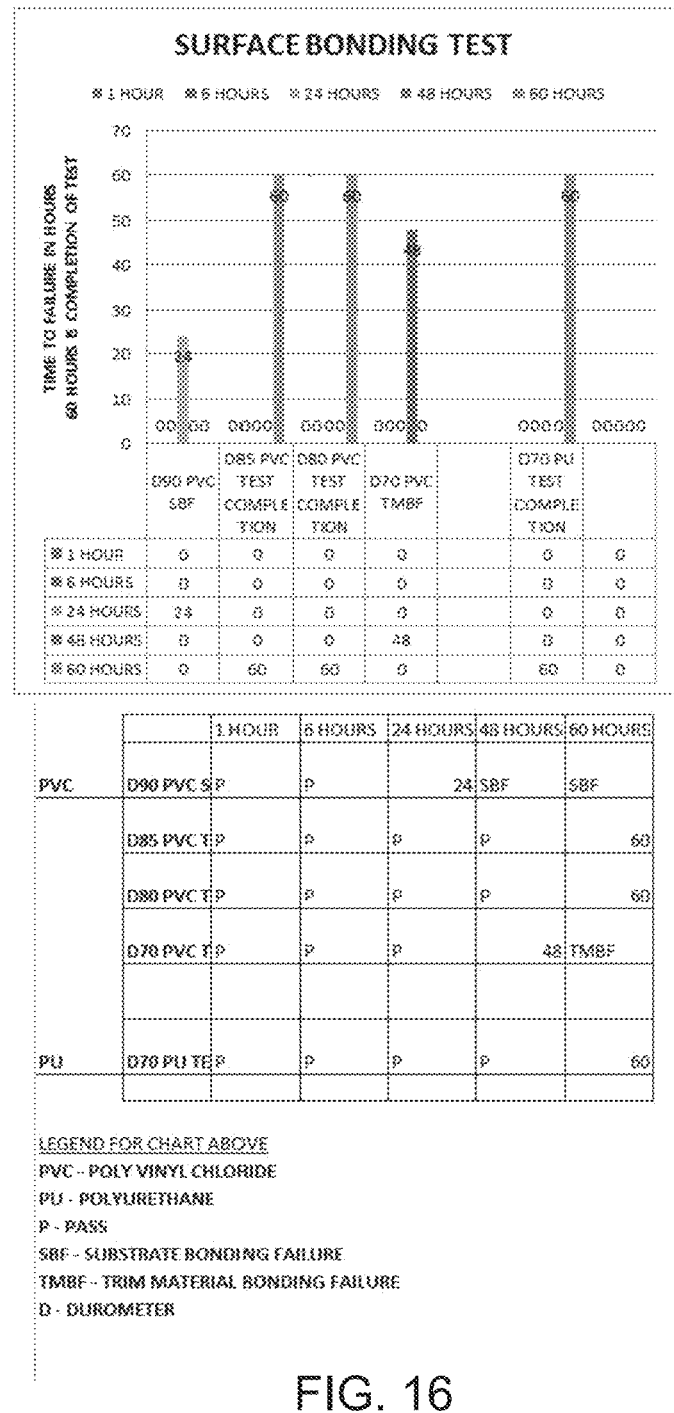
FIG. 16 is a graph and legend depicting results of a surface bonding test according to an embodiment of the invention.

Monitoring parameters test samples were checked for delamination at intervals of 1 hour, 6 hours, 24 hours, 48 hours and 60 hours. Delamination was determined by any separation of adhesive tape from the rigid PVC angle 192 and/or separation of adhesive tape from the PVC or polyurethane trim piece 110 being tested. Test results are presented in FIGS. 15 and 16.

Based on the testing, trim piece 110 according to the invention using the proprietary Siltak® adhesive requires a durometer measurement by Shore A of between 80 and 85 for PVC trim pieces 110 and a durometer measurement of Shore A of between 60 and 70 with polyurethane trim pieces 110.

The invention having been disclosed in connection with the foregoing variations and examples, additional variations will now be apparent to persons skilled in the art. The invention is not intended to be limited to the variations specifically mentioned, and reference should be made to the drawings rather than the foregoing discussion of preferred examples, to assess the scope of the invention.

The invention claimed is:

1. A trim piece for sealing a joint in a work surface, the trim piece comprising:
an elongated unitary structure of indeterminate length which when viewed in cross section, includes:
a body having a top cap comprising an upper surface and a lower surface and an extrusion nipple extending centrally downwardly from the lower surface of the top cap, wherein at least one of the extrusion nipple and the top cap is coupled to an adhesive portion;
the top cap further comprising a first portion and a second portion extending outwardly away relative to the extrusion nipple in a first direction and an opposing second direction, the first portion and the second portion comprising a first radius portion and a second radius portion respectively, the first radius portion and the second radius portion each comprising a decreasing thickness forming a curved surface to the first portion and the second portion, thereby facilitating flexibility of the first portion and the second portion;
the extrusion nipple comprising a portion having substantially parallel sides; and
the adhesive portion having a shape comprising a first outer contact surface extending at an angle to the first direction and a second outer contact surface extending at an angle to the second direction, such that the first outer contact surface meets the lower surface of the first portion proximate a boundary of the first radius portion and the second outer contact surface meets the lower surface of the second portion proximate a boundary of the second radius portion.

2. The trim piece as claimed in claim 1, wherein the adhesive portion is coupled to both the extrusion nipple and the top cap.

3. The trim piece as claimed in claim 1, wherein the decreasing thicknesses of the first radius portion and the second radius portion are continuously decreasing thicknesses extending to a respective distal edge forming a continuously curving surface.

4. The trim piece as claimed in claim 1, wherein the first outer contact surface and the second outer contact surface of the adhesive portion are completely flush and continuous with the curved surface of the first portion and the curved surface of the second portion respectively.

5. The trim piece as claimed in claim 1, wherein the portion having parallel sides is a first portion and the extrusion nipple further comprises a second portion which narrows from a width of the parallel sides to a smaller width at a distal end thereof.

6. The trim piece as claimed in claim 5, wherein the first outer contact surface and the second outer contact surface of the adhesive portion meet at the distal end of the extrusion nipple and cover it.

7. The trim piece as claimed in claim 6, wherein the shape of the adhesive portion is a rounded triangular shape.

8. The trim piece as claimed in claim 5, the extrusion nipple further comprising a third portion between the first portion and the lower surface of the top cap connecting to the lower surface thereof, the third portion comprising a first outwardly extending structure in the first direction and a second outwardly extending structure in the second direction.

9. The trim piece as claimed in claim 8, the first extending structure and second extending structure each comprising a concavely curving portion.

10. The trim piece as claimed in claim 1, wherein the body comprises a multi-durometer extrusion.

11. The trim piece as claimed in claim 1, wherein the trim piece is formed from a material selected from a group consisting of PVC, TPO, bio-based polymer and ethylene vinyl acetate copolymer.

12. The trim piece as claimed in claim 1, wherein the upper surface of the top cap comprises a decorative surface.

13. A method of making a method trim piece for sealing a joint in a work surface, the trim comprising:

forming from a polymer material an elongated unitary structure of indeterminate length which when viewed in cross section, includes a body having a top cap comprising an upper surface and a lower surface and an extrusion nipple extending centrally downwardly from the lower surface of the top cap, wherein at least one of the extrusion nipple and the top cap is coupled to an adhesive portion;

the top cap further comprising a first portion and a second portion extending outwardly away relative to the extrusion nipple in a first direction and an opposing second direction, the first portion and the second portion comprising a first radius portion and a second radius portion respectively, the first radius portion and the second radius portion each comprising a decreasing thickness forming a curved surface to the first portion and the second portion, to facilitate flexibility of the first portion and the second portion;

the extrusion nipple comprising a portion having substantially parallel sides; and the adhesive portion having a shape comprising a first outer contact surface extending at an angle to the first direction and a second outer contact surface extending at an angle to the second direction, such that the first outer contact surface meets the lower surface of the first portion proximate a boundary of the first radius portion and the second outer contact surface meets the lower surface of the second portion proximate a boundary of the second radius portion.

14. The method as claimed in claim 13, wherein the adhesion portion is coupled to at least one of the top cap or the extrusion nipple by co-forming with or applying thereto.

15. The method as claimed in claim 13, wherein the step of forming comprises extrusion or coextrusion.

16. The method as claimed in claim 14, wherein the adhesion portion is coupled by co-forming with the body, the co-forming comprising co-extrusion.

* * * * *